Patented June 10, 1952

2,599,566

UNITED STATES PATENT OFFICE 2,599,566

CHROME-MAGNESIA REFRACTORIES

Ralph Joseph Magri, Jr., Lynchburg, Va., assignor to Corhart Refractories Company, Louisville, Ky., a corporation of Delaware No Drawing. Application June 27, 1951,
Serial No. 233,945

16 Claims. (Cl. 106—59)

This invention relates to fused or heat-cast refractories and is particularly concerned with the provision of an improved refractory especially adapted for use in the manufacture of steel. This application is a continuation-in-part of my copending application, Serial No. 7,710 filed February 11, 1948, now abandoned and of my copending application, Serial No. 83,999, filed March 28, 1949, now abandoned.

The use of tonnage oxygen in the open hearth furnace has recently been shown to markedly speed up steel production. Such practice, however, subjects the furnace refractories to considerably increased punishment, which in the case of the roof refractories, for example, may lower their life by as much as 50%. Corresponding improvement in such refractories is obviously imperative then if full economic advantage of the use of oxygen is to be realized. Moreover, since some five pounds of basic refractories alone are consumed for each ton of steel produced, it is also obvious that any such improved refractory must be made from raw materials common enough to be available in large quantities and cheap enough to enable such refractory to compete with present tonnage refractories in proportion to the savings obtained.

Patent No. 2,408,305 to Field describes a chromespinel composition which contains FeO, MgO, $Al_2O_3$, and $Cr_2O_3$ in a particular relationship and which, when melted at very high temperatures and then solidified in a mold, yields a very dense crystalline refractory with notable resistance to erosion by ferruginous slags in comparison to the more usual porous sintered refractories. Such chrome-spinel composition contains an appreciable amount of FeO, a feature of importance since it allows the use of a considerable percentage of commercial chrome ore in the raw batch. Unfortunately this dense refractory is less resistant to heat shock or spalling than the more usual porous burnt refractories, which property restricts its possible places of application and in particular prevents its use as a roof refractory in an open hearth furnace where, as pointed out above, improvement is especially desirable to permit higher operating temperatures.

I have now discovered that the resistance to heat shock or spalling of such high-iron chromespinel refractory can be markedly improved, without any adverse effect on its slag resistance, by increasing its magnesia content so that, when the melted batch is solidified, a substantial amount of periclase crystallizes as a separate phase. In fact, not only must the magnesia content of the resulting refractory be sufficient so that the periclase phase is present in significant amount, but the ratio of the mols of RO oxides to the mols of $R_2O_3$ oxides must be materially above unity in order to impart a satisfactory degree of spalling resistance to such refractory. Such ratio, I have found, should be at least 2.2 and is advantageously at least 3.5.

That my new refractories should possess such improved spalling resistance is quite surprising and unexpected since periclase itself has a higher coefficient of expansion than the chrome-spinel composition described in the Field patent. The coefficient of expansion of my refractories is not high relative to that of other refractories, however, and in some instances is even less than the expansion coefficients of various commercial burnt chrome and magnesite refractories.

The tensile strength of the present refractories is higher than that of commercial burnt chrome and magnesite refractories so that greater strains can be developed therein before failure. On the other hand the thermal conductivity of my refractories is also higher so that the temperature gradients obtained within such refractories when they are subjected to alternate heating and cooling are lessened. Apparently these properties are more significant with respect to spalling resistance than the dense structure of these refractories. In any event, in actual comparative heat-shock tests with panels of refractory bricks heated from 800° C. to 1400° C. at the rate of 200° C. per hour and then alternately cooled with a water spray and similarly reheated at 20-minute intervals, I have found my improved refractory compositions superior in spalling resistance to commercial burnt magnesite and chrome refractories.

As will be appreciated, relatively high temperatures are required to fuse the present compositions so that electric melting must be resorted to. The raw materials can be melted in a conventional electric furnace, the shell of which is lined with material of a composition similar to that of the refractory to be produced. The molten material can then be cast into molds. The resulting refractory pieces, following initial solidification, should be annealed either from their own heat of crystallization with the aid of appropriate insulation or with the addition of external heat in a lehr.

In the resulting fused refractory, as can be determined by analysis, the FeO is partitioned between the periclase phase, in which it is present in solid solution, and the spinel phase, in which it is present, of course, as an RO spinel-forming oxide. Apparently what happens is that, as the spinel phase is formed upon cooling and solidification of the molten mass, the MgO forms spinels with the $R_2O_3$ oxides in preference to the FeO so that, in effect, the FeO is in part displaced into the periclase phase formed by the remaining MgO.

By reason of its dense structure, a heat-cast refractory is afforded an initial advantage with respect to slag resistance over a burnt or sintered refractory, the porosity of which naturally permits a more rapid attack by slag.

The proportions of the several oxides forming the basis of the present refractory can nevertheless be varied only within limits in accordance with the nature of the slag with which the refractory is to come in contact. While, for example, the resistance of my novel refractory to attack by basic slag improves with an increase in MgO (and, hence, the periclase phase), its resistance to acid slag attack tends to correspondingly decrease. Conversely, too low an MgO content decreases the ability of the refractory to withstand basic slag attack. Similarly, an increase in $Cr_2O_3$ (and, hence, the chrome-containing spinel phase) improves the resistance of my refractory to acid slag attack but tends to lower its resistance to basic slag. Too low a $Cr_2O_3$ content, on the other hand, decreases the resistance of the refractory to acid slag attack. A high ratio of $Cr_2O_3$ to $Al_2O_3$ also favors acid slag resistance. Where both types of slag are encountered as in open hearth practice, a practical compromise is of course necessary.

The proportions within which these several oxides can be varied are also determined by the effect of the variation on the spalling resistance of the refractory and by other factors. The $Al_2O_3$ and $Cr_2O_3$ content, for example, can not be increased to such an extent that the ratio of the mols of RO oxides to the mols of $R_2O_3$ oxides falls below about 2.2 and the resistance of the refractory to spalling becomes unsatisfactory. For the same reason, the content of FeO and MgO can not be so lowered that such ratio becomes less than 2.2. Moreover, as indicated above, sufficient MgO must be present to form the periclase phase, which, as can be readily determined, will amount to a minimum of approximately 15 to 20%. As will be apparent, a periclase phase can be formed only if an excess of RO oxide exists beyond that required to combine with the $R_2O_3$ oxides to form $RO.R_2O_3$.

The presence of FeO in the periclase phase does not appear to adversely affect its slag resistance.

Additionally, as the MgO content is increased, the temperature required to effect fusion also increases with the results that volatilization of MgO becomes more and more appreciable and the production of a commercially satisfactory and usable refractory casting becomes more and more difficult. Cracking of the refractory blocks or castings also occurs to an increasingly greater extent with very high percentages of FeO.

With these several considerations in mind, then, my improved refractory composition comprises and analytically contains 5 to 25% FeO, 25 to 78% MgO, 5 to 25% $Al_2O_3$, and 12 to 50% $Cr_2O_3$; with the ratio of the mols of FeO and MgO to the mols of $Al_2O_3$ and $Cr_2O_3$ being at least 2.2. To provide adequate slag resistance, moreover, the total of such oxides should amount to at least 82% of the entire refractory composition and advantageously should amount to at least 90%.

Since the heat-casting process required for the manufacture of the present refractories is inherently more expensive than the conventional sintering techniques of making refractories, it is an especially important feature of my invention that the instant refractory compositions, and particularly the preferred composition described below, require only commonly available and relatively inexpensive raw materials, namely chrome ore and commercial calcined magnesite, for their production. Since, however, my refractories are completely melted before casting, only the final chemical composition of the melted material is of concern, and any suitable raw materials including by-products or beneficiated concentrates can be utilized in proportions which will maintain the final composition of the melt within the desired ranges.

Chrome ore is basically chromite, which is ideally $FeO.Cr_2O_3$. As is well known, however, in nature appreciable MgO replaces FeO and appreciable $Al_2O_3$ replaces $Cr_2O_3$ in the spinel lattice with the result that commercial chrome ores, which also contain a small amount of gangue, composed usually of magnesium silicates, cover a relatively wide range of compositions. Those ores high in $Cr_2O_3$ are most useful for chemical and metallurgical purposes and command correspondingly higher prices than the more abundant grades with lower $Cr_2O_3$ content which are widely used for refractory purposes. The more usual ranges of chrome ore composition may be indicated as follows:

| | Per cent |
|---|---|
| $Cr_2O_3$ | 30–50 |
| FeO | 12–25 |
| MgO | 10–20 |
| $Al_2O_3$ | 11–27 |
| $SiO_2$ | 2–8 |

For the production of sintered refractories it is generally preferred to use those chrome ores higher in MgO and lower in FeO. I have found however that the less expensive ores, higher in FeO, are quite satisfactory for my purpose because of the apparently harmless displacement of FeO into solid solution in the periclase phase. It is to be noted, moreover, that the melting point of chrome ore is high in itself and that the temperature required for melting the present composition progressively increases as the proportion of calcined magnesite to the chrome ore is increased. Since the less expensive chrome ores, of lower $Cr_2O_3$ and higher FeO content, melt more easily, a larger addition of magnesite can then be made, if desired, without increasing the melting difficulty.

Since electric melting with graphite electrodes, as is the conventional practice, results in reduction of some of the FeO and the $Cr_2O_3$ as well as volatilization of some of the MgO it might be supposed that composition control of the resulting refractory product would be difficult. I have found, however, that such losses generally balance in such a way that the percentages of $Cr_2O_3$ and FeO in the fused product are substantially those of the batch, while there is an increase in alumina at the expense of magnesia. It is only necessary therefore to add an extra amount of calcined magnesite to the batch to make up for the anticipated loss, the excess required being larger as the magnesite proportion and consequently the melting temperature increase.

As indicated above, commercial chrome ores contain a small amount of siliceous gangue. When a chrome ore is used as a raw material in the preparation of the present refractory, then, a siliceous matrix containing any impurities is also formed upon solidification of the molten refractory composition. This siliceous matrix is largely crystalline in nature, even in relatively rapidly cooled castings. In the absence of appreciable calcium oxide, this siliceous matrix or phase has the crystallographic properties of forsterite, $2MgO.SiO_2$, with presumably some FeO replacing a part of the MgO.

Moderate amounts of this siliceous matrix, such as are fortunately obtained with commercial grade chrome ores, are not harmful either to the heat-shock resistance of my refractory or to its resistance to acid slag attack. As the percentage of silica is increased, however, resistance to spalling decreases; and with larger amounts the castings crack so badly even before heating that they are unsaleable.

For this reason it is not generally feasible to use olivine, a typical analysis of which is 47% MgO, 7% FeO, 1% CaO, and 44% $SiO_2$, as a source of magnesia.

Moreover, as the silica content is increased, the resistance of the present refractory against acid slag decreases. From this standpoint as well as the standpoint of heat-shock resistance, therefore, the $SiO_2$ content should be not more than 8% and advantageously not more than 5%.

With $SiO_2$ in the composition, the periclase phase can, of course, be formed only if there is an excess of RO oxide beyond that required to combine with the $SiO_2$ to form $2RO.SiO_2$ and to combine with the $Al_2O_3$ and the $Cr_2O_3$ to form $RO.R_2O_3$. An excess of RO oxide is therefore indicated when the ratio of the mols of FeO and MgO to the mols of $Al_2O_3$ and $Cr_2O_3$ plus half the mols of $SiO_2$ exceeds unity. As previously pointed out, this ratio is at least 2.2 and advantageously at least 3.5 in the present refractory.

Commercially available calcined magnesites of good quality generally contain a small amount of CaO as an impurity. Dolomitic magnesites may also be utilized under certain conditions, but then CaO in appreciable quantities will be included in the refractory composition. Since CaO does not form a spinel, it will appear in the siliceous matrix when it is present in the raw materials. As the CaO increases in proportion, it progressively replaces MgO to give monticellite, dicalcium silicate, and finally tricalcium silicate. If the combining power of the $SiO_2$ is exceeded, calcium chromite is formed with the result that serious cracking of the castings occurs during their manufacture. The basic slag resistance of the present refractory is also decreased as the CaO content is increased, especially in the presence of significant quantities of $SiO_2$.

For these reasons, then, the CaO content should not be more than 10%; and advantageously no more than 3% CaO is present.

Since the effect of CaO is to displace MgO from the siliceous matrix, an excess of RO oxide is indicated in such case when the ratio of the mols of FeO, MgO, and CaO to the mols of $Al_2O_3$ and $Cr_2O_3$ plus half the mols of $SiO_2$ (if present) exceeds unity. As already stated, this ratio is at least 2.2 and advantageously at least 3.5 in the present refractory.

Because of the use of graphite or carbon electrodes in the electric-furnace melting of heat-cast refractories, it is normally expected that ferric oxide in the raw materials will be reduced to ferrous oxide. I have found however that in the presence of large proportions of magnesia, relatively high concentrations of ferric oxide can be maintained in the present refractory. The moderate amounts of ferric oxide that might be obtained from the use of ferruginous bauxite or partially oxidized chrome ore or the like show no appreciable effect on the resistance to heat shock. As the $Fe_2O_3$ content is increased, however, the heat-shock resistance becomes gradually less. Moreover, if raw materials are used which permit the concentration of ferric oxide to become too high, a second spinel phase, immiscible with the chrome-containing spinel phase, results and serious cracking of the castings occurs. This additional spinel phase has the properties of magnesio-ferrite, $MgO.Fe_2O_3$. Because of these adverse effects, the $Fe_2O_3$ content should not be more than 7% and is advantageously no more than 5%.

The $Fe_2O_3$ initially enters the chrome-containing spinel phase as another $R_2O_3$ oxide and, when present, should be taken into account in determining the $RO.R_2O_3$ ratio. In such system therefore an excess of RO oxide is indicated when the ratio of the mols of MgO, FeO, and CaO (if present) to the mols of $Al_2O_3$, $Cr_2O_3$, and $Fe_2O_3$ plus half the mols of $SiO_2$ (if present) exceeds unity.

As indicated above, this ratio is at least 2.2 and is advantageously at least 3.5 in the present refractory.

The melt (casting) analyses given in Table I are illustrative of the composition of my improved refractory:

*Table I*

| Melt | FeO | MgO | $Al_2O_3$ | $Cr_2O_3$ | $SiO_2$ | CaO | $Fe_2O_3$ |
|---|---|---|---|---|---|---|---|
| I | 10.6 | 28.0 | 38.6 | 21.2 | 1.4 | 0.2 | |
| II | 24.4 | 20.1 | 17.4 | 33.0 | 4.6 | 0.5 | |
| III | 7.9 | 34.2 | 18.7 | 37.0 | 2.0 | 0.2 | |
| IV | 20.3 | 25.8 | 16.3 | 33.2 | 4.2 | 0.2 | |
| V | 18.4 | 28.1 | 15.8 | 31.2 | 6.3 | 0.2 | |
| VI | 16.7 | 29.9 | 18.9 | 28.5 | 5.9 | 0.1 | |
| VII | 12.9 | 32.4 | 5.2 | 46.2 | 3.1 | 0.2 | |
| VIII | 15.2 | 29.7 | 16.9 | 31.3 | 2.7 | 4.2 | |
| IX | 17.9 | 36.4 | 12.4 | 29.1 | 4.0 | 0.2 | |
| X | 7.7 | 48.0 | 22.8 | 18.2 | 2.4 | 0.9 | |
| XI | 17.2 | 32.6 | 9.2 | 31.9 | 2.7 | 6.4 | |
| XII | 7.9 | 53.8 | 10.6 | 20.9 | 1.4 | 0.4 | 5.0 |
| XIII | 12.3 | 48.6 | 8.2 | 20.5 | 7.4 | 3.0 | |
| XIV | 11.2 | 49.1 | 7.5 | 26.5 | 2.4 | 3.3 | |
| XV | 13.8 | 49.7 | 6.7 | 21.6 | 2.5 | 0.5 | 5.2 |

Each of these refractory castings comprises a chrome-containing spinel, a crystalline solid solution of ferrous oxide in magnesium oxide (periclase), and a siliceous matrix. There is only one spinel phase, which contains both FeO and MgO as RO oxides and both $Cr_2O_3$ and $Al_2O_3$ (and $Fe_2O_3$) as $R_2O_3$ oxides in random distribution. Only melts IV to XV possess satisfactory resistance to spalling as well as satisfactory resistance to slag attack, however, melts I to III exhibiting poor or unsatisfactory spalling resistance. As can readily be determined (in the manner explained above), the molal ratio of RO oxides to $R_2O_3$ oxides in melts IV to XV is 2.2 or greater, whereas such ratio for each of melts I to III is only 1.6, 1.9, and 2.1 respectively.

Especially good resistance to heat shock or spalling as well as especially good resistance to both acid slag and basic slag are obtained when my improved refractory composition comprises and analytically contains 7 to 20% FeO, 35 to 68% MgO, 5 to 21% $Al_2O_3$, and 12 to 40% $Cr_2O_3$, the total of such oxides amounting to at least 90%, the molal ratio of RO oxides to $R_2O_3$ oxides (as determined in accordance with the above-explained procedures) being at least 3.5. Any $SiO_2$, CaO, or $Fe_2O_3$ that may be present should desirably be no more than 8%, 3%, or 5% respectively. The melt (casting) analyses given in Table II are illustrative of this preferred range of compositions:

*Table II*

| Melt | FeO | MgO | $Al_2O_3$ | $Cr_2O_3$ | $SiO_2$ | CaO | $Fe_2O_3$ |
|---|---|---|---|---|---|---|---|
| XVI | 13.8 | 45.8 | 11.3 | 25.2 | 3.7 | 0.2 | |
| XVII | 17.8 | 42.3 | 11.4 | 22.9 | 2.8 | 0.5 | 2.3 |
| XVIII | 13.1 | 46.5 | 10.1 | 22.1 | 7.7 | 0.5 | |
| XIX | 13.9 | 46.9 | 8.1 | 24.4 | 6.4 | 0.3 | |
| XX | 15.0 | 44.7 | 7.3 | 23.7 | 6.5 | 2.8 | |
| XXI | 13.0 | 49.5 | 12.0 | 20.0 | 5.1 | 0.4 | |
| XXII | 10.2 | 52.3 | 13.0 | 20.3 | 3.5 | 0.7 | |
| XXIII | 11.6 | 51.9 | 11.3 | 20.6 | 3.9 | 0.7 | |
| XXIV | 14.4 | 51.2 | 6.8 | 21.5 | 5.8 | 0.3 | |
| XXV | 12.1 | 53.8 | 10.0 | 20.5 | 2.9 | 0.7 | |
| XXVI | 14.6 | 52.1 | 8.7 | 21.9 | 2.0 | 0.7 | |
| XXVII | 10.9 | 56.3 | 7.7 | 18.5 | 6.4 | 0.2 | |
| XXVIII | 8.3 | 63.5 | 7.0 | 17.2 | 1.8 | 0.2 | 2.0 |

Best resistance to spalling and to slag attack has been obtained with refractory compositions comprising and analytically containing 9 to 17% FeO, 42 to 57% MgO, 5 to 15% $Al_2O_3$, and 15 to 30% $Cr_2O_3$ with the total of such oxides being at least 90% and with the molal ratio of RO oxides to $R_2O_3$ oxides (determined as explained above) being at least 4.0 and with any $SiO_2$, CaO, or $Fe_2O_3$ present desirably being no more than 5%, 3%, or 5% respectively. An analysis of a composite sample of several thousand castings which fall within this more limited range and which gave satisfactory performance in open-hearth tests is as follows:

| | |
|---|---|
| $Cr_2O_3$ | 20.5 |
| $Al_2O_3$ | 7.8 |
| MgO | 53.6 |
| Fe as FeO | 13.3 |
| $SiO_2$ | 2.4 |

Since all the phases except the chrome-containing spinel are soluble in strong acid it is relatively simple to determine the proportion of the spinel phase by acid-leaching of a finely ground sample. In the above composite sample, 40.3% of chrome-containing spinel was found, the analysis of which is:

| | Per cent |
|---|---|
| $Cr_2O_3$ | 51.2 |
| MgO | 20.8 |
| $Al_2O_3$ | 19.5 |
| FeO | 4.9 |
| $Fe_2O_3$ | 3.6 |

The acid-soluble fraction, consisting chiefly of periclase (containing FeO in solid solution) and forsterite, contained Fe equivalent to 16.9% FeO.

The melt (casting) analyses given in Table III are illustrative of the effect of too much $SiO_2$:

*Table III*

| Melt | FeO | MgO | $Al_2O_3$ | $Cr_2O_3$ | $SiO_2$ | CaO |
|---|---|---|---|---|---|---|
| XXVI | 14.6 | 52.1 | 8.7 | 21.9 | 2.9 | 0.7 |
| XVI | 13.8 | 45.8 | 11.3 | 25.2 | 3.7 | 0.2 |
| XXIV | 14.4 | 51.2 | 6.8 | 21.5 | 5.8 | 0.3 |
| XVIII | 13.1 | 46.5 | 10.1 | 22.1 | 7.7 | 0.5 |
| XXIX | 12.7 | 43.1 | 13.5 | 19.8 | 10.6 | 0.3 |

The spalling resistance of the first four melts was satisfactory, but melt XXIX cracked so badly during annealing that it was unusable. Furthermore, as already indicated, the resistance of my refractory to acid slag attack decreases as the $SiO_2$ content becomes too high.

Table IV presents several melt (casting) analyses illustrating the effect of too much CaO:

*Table IV*

| Melt | FeO | MgO | $Al_2O_3$ | $Cr_2O_3$ | $SiO_2$ | CaO |
|---|---|---|---|---|---|---|
| XX | 15.0 | 44.7 | 7.3 | 23.7 | 6.5 | 2.8 |
| VIII | 15.2 | 29.7 | 16.9 | 31.3 | 2.7 | 4.2 |
| XI | 17.2 | 32.6 | 9.2 | 31.9 | 2.7 | 6.4 |
| XXX | 17.2 | 23.2 | 9.1 | 32.9 | 4.6 | 13.0 |
| XXXI | 16.1 | 20.4 | 12.6 | 31.9 | 3.8 | 15.2 |
| XXXII | 12.3 | 46.7 | 7.1 | 20.8 | 8.0 | 5.1 |

The first three melts possessed satisfactory resistance to basic slag whereas melt XXX was readily attacked by basic slag. Melt XXXI contained sufficient CaO to form calcium chromite so that the refractory cracked during annealing. As will be apparent from the previous discussion, then, the molal ratio of CaO to $SiO_2$ should not exceed 3 in order to avoid the formation of calcium chromite.

Moreover, as the $SiO_2$ approaches the upper end of its range, the CaO content should be maintained such that the total of $SiO_2$ and CaO is no greater than 10% in order to avoid a tendency to crack during annealing, as exhibited by melt XXXII. It should be noted that, in any event, the total of $SiO_2$ and CaO should generally not greatly exceed 10% since otherwise a decreased resistance to slag attack results.

The effect of including too high an $Fe_2O_3$ content in the present refractory is shown by the melt (casting) analyses given in Table V:

*Table V*

| Melt | FeO | MgO | $Al_2O_3$ | $Cr_2O_3$ | $SiO_2$ | CaO | $Fe_2O_3$ |
|---|---|---|---|---|---|---|---|
| XXXIII | 14.0 | 51.8 | 12.7 | 16.6 | 2.6 | 0.5 | 1.8 |
| XVII | 17.8 | 42.3 | 11.4 | 22.9 | 2.8 | 0.5 | 2.3 |
| XXVI | 11.6 | 52.1 | 8.4 | 21.9 | 2.0 | 0.7 | 3.3 |
| XII | 7.9 | 53.8 | 10.6 | 20.9 | 1.4 | 0.4 | 5.0 |
| XV | 13.8 | 49.7 | 6.7 | 21.6 | 2.5 | 0.5 | 5.2 |
| XXXIV | 14.2 | 53.6 | 6.3 | 15.9 | 1.4 | 0.7 | 7.9 |
| XXXV | 20.9 | 34.2 | 11.4 | 21.0 | 3.0 | 0.5 | 9.0 |

The spalling resistance of the first five melts was satisfactory whereas melts XXXIV and XXXV, which contained sufficient $Fe_2O_3$ to form a separate $Fe_2O_3$-containing spinel phase, possessed poor spalling resistance.

The batches, the oxide analyses of which are set forth in Table VI, also give castings satisfactory in heat-shock resistance and slag resistance:

*Table VI*

| Batch | FeO | MgO | $Al_2O_3$ | $Cr_2O_3$ | $SiO_2$ | CaO | $Fe_2O_3$ |
|---|---|---|---|---|---|---|---|
| XXXVI | 19.1 | 28.6 | 13.4 | 33.7 | 4.7 | 0.3 | |
| XXXVII | 16.8 | 37.2 | 11.8 | 29.5 | 4.1 | 0.4 | |
| XXXVIII | 14.4 | 45.9 | 10.1 | 25.3 | 3.6 | 0.6 | |
| XXXIX | 12.1 | 54.4 | 8.5 | 21.1 | 3.1 | 0.7 | |
| XL | 9.7 | 63.1 | 6.8 | 16.9 | 2.5 | 0.9 | |
| XLI | 7.3 | 71.6 | 5.2 | 12.6 | 2.0 | 1.0 | |
| XLII | 11.9 | 50.1 | 5.8 | 26.7 | 4.8 | 0.7 | |
| XLIII | 6.0 | 57.0 | 11.7 | 20.6 | 4.3 | 0.4 | |
| XLIV | 8.1 | 55.0 | 9.1 | 21.0 | 1.0 | 0.4 | 5.4 |
| XLV | 18.5 | 44.8 | 6.7 | 22.3 | 2.9 | 0.3 | 4.5 |
| XLVI | 17.8 | 33.7 | 11.4 | 26.8 | 3.3 | 0.4 | 6.6 |

I claim:

1. A fused refractory material comprising a chrome-containing spinel and a crystalline solid solution of ferrous oxide in magnesium oxide, said refractory material analytically containing 5 to 25% FeO, 25 to 78% MgO, 5 to 25% $Al_2O_3$, and 12 to 50% $Cr_2O_3$, the total of such oxides amounting to at least 82%, the ratio of the mols of FeO and MgO to the mols of $Al_2O_3$ and $Cr_2O_3$ being at least 2.2.

2. The fused refractory material as claimed in claim 1, in which the total of FeO, MgO, $Al_2O_3$ and $Cr_2O_3$ amounts to at least 90%.

3. A fused refractory material comprising a chrome-containing spinel, a crystalline solid solution of ferrous oxide in magnesium oxide, and a siliceous matrix, said refractory material analytically containing 5 to 25% FeO, 25 to 78% MgO, 5 to 25% $Al_2O_3$, and 12 to 50% $Cr_2O_3$, the total of such oxides amounting to at least 82%, and $SiO_2$ in an amount up to 8%, the ratio of the mols of FeO and MgO to the mols of $Al_2O_3$ and $Cr_2O_3$ plus half the mols of $SiO_2$ being at least 2.2.

4. The fused refractory material as claimed in claim 3, in which the total of FeO, MgO, $Al_2O_3$, and $Cr_2O_3$ amounts to at least 90%.

5. A fused refractory material comprising a chrome-containing spinel, a crystalline solid solution of ferrous oxide in magnesium oxide, and a siliceous matrix, said refractory material analytically containing 5 to 25% FeO, 25 to 78% MgO, 5 to 25% $Al_2O_3$, and 12 to 50% $Cr_2O_3$, the total of such oxides amounting to at least 82%, $SiO_2$ in an amount up to 8%, and CaO in an amount up to 10%, the ratio of the mols of FeO, MgO and CaO to the mols of $Al_2O_3$ and $Cr_2O_3$ plus half the mols of $SiO_2$ being at least 2.2.

6. The fused refractory material as claimed in claim 5, in which the total of FeO, MgO, $Al_2O_3$, and $Cr_2O_3$ amounts to at least 90%.

7. A fused refractory material comprising a chrome-containing spinel, a crystalline solid solution of ferrous oxide in magnesium oxide, and a siliceous matrix, said refractory material analytically containing 5 to 25% FeO, 25 to 78% MgO, 5 to 25% $Al_2O_3$, and 12 to 50% $Cr_2O_3$, the total of such oxides amounting to at least 82%, $SiO_2$ in an amount up to 8%, CaO in an amount up to 10%, and $Fe_2O_3$ in an amount up to 7%, the ratio of the mols of FeO, MgO and CaO to the mols of $Al_2O_3$, $Cr_2O_3$ and $Fe_2O_3$ plus half the mols of $SiO_2$ being at least 2.2.

8. The fused refractory material as claimed in claim 7, in which the total of FeO, MgO, $Al_2O_3$, and $Cr_2O_3$ amounts to at least 90%.

9. A fused refractory material comprising a chrome-containing spinel and a crystalline solid solution of ferrous oxide in magnesium oxide, said refractory material analytically containing 7 to 20% FeO, 35 to 68% MgO, 5 to 21% $Al_2O_3$, and 12 to 40% $Cr_2O_3$, the total of such oxides amounting to at least 90%, the ratio of the mols of FeO and MgO to the mols of $Al_2O_3$ and $Cr_2O_3$ being at least 3.5.

10. A fused refractory material comprising a chrome-containing spinel, a crystalline solid solution of ferrous oxide in magnesium oxide, and a siliceous matrix, said refractory material analytically containing 7 to 20% FeO, 35 to 68% MgO, 5 to 21% $Al_2O_3$, and 12 to 40% $Cr_2O_3$, the total of such oxides amounting to at least 90%, and $SiO_2$ in an amount up to 8%, the ratio of the mols of FeO and MgO to the mols of $Al_2O_3$ and $Cr_2O_3$ plus half the mols of $SiO_2$ being at least 3.5.

11. A fused refractory material comprising a chrome-containing spinel, a crystalline solid solution of ferrous oxide in magnesium oxide, and a siliceous matrix, said refractory material analytically containing 7 to 20% FeO, 35 to 68% MgO, 5 to 21% $Al_2O_3$, and 12 to 40% $Cr_2O_3$, the total of such oxides amounting to at least 90%, $SiO_2$ in an amount up to 8%, and CaO in an amount up to 3%, the ratio of the mols of FeO, MgO, and CaO to the mols of $Al_2O_3$ and $Cr_2O_3$ plus half the mols of $SiO_2$ being at least 3.5.

12. A fused refractory material comprising a chrome-containing spinel, a crystalline solid solution of ferrous oxide in magnesium oxide, and a siliceous matrix, said refractory material analytically containing 7 to 20% FeO, 35 to 68% MgO, 5 to 21% $Al_2O_3$, and 12 to 40% $Cr_2O_3$, the total of such oxides amounting to at least 90%, $SiO_2$ in an amount up to 8%, CaO in an amount up to 3%, and $Fe_2O_3$ in an amount up to 5%, the ratio of the mols of FeO, MgO, and CaO to the mols of $Al_2O_3$, $Cr_2O_3$ and $Fe_2O_3$ plus half the mols of $SiO_2$ being at least 3.5.

13. A fused refractory material comprising a chrome-containing spinel and a crystalline solid solution of ferrous oxide in magnesium oxide, said refractory material analytically containing 9 to 17% FeO, 42 to 57% MgO, 5 to 15% $Al_2O_3$, and 15 to 30% $Cr_2O_3$, the total of such oxides amounting to at least 90%, the ratio of the mols of FeO and MgO to the mols of $Al_2O_3$ and $Cr_2O_3$ being at least 4.0.

14. A fused refractory material comprising a chrome-containing spinel, a crystalline solid solution of ferrous oxide in magnesium oxide, and a siliceous matrix, said refractory material analytically containing 9 to 17% FeO, 42 to 57% MgO, 5 to 15% $Al_2O_3$, and 15 to 30% $Cr_2O_3$, the total of such oxides amounting to at least 90%, and $SiO_2$ in an amount up to 5%, the ratio of the mols of FeO and MgO to the mols of $Al_2O_3$ and $Cr_2O_3$ plus half the mols of $SiO_2$ being at least 4.0.

15. A fused refractory material comprising a chrome-containing spinel, a crystalline solid solution of ferrous oxide in magnesium oxide, and a siliceous matrix, said refractory material analytically containing 9 to 17% FeO, 42 to 57% MgO, 5 to 15% $Al_2O_3$, and 15 to 30% $Cr_2O_3$, the total of such oxides amounting to at least 90%, $SiO_2$ in an amount up to 5%, and CaO in an amount up to 3%, the ratio of the mols of FeO, MgO, and CaO to the mols of $Al_2O_3$ and $Cr_2O_3$ plus half the mols of $SiO_2$ being at least 4.0.

16. A fused refractory material comprising a chrome-containing spinel, a crystalline solid solution of ferrous oxide in magnesium oxide, and a siliceous matrix, said refractory material analytically containing 9 to 17% FeO, 42 to 57% MgO, 5 to 15% $Al_2O_3$, and 15 to 30% $Cr_2O_3$, the total of such oxides amounting to at least 90%, $SiO_2$ in an amount up to 5%, CaO in an amount up to 3%, and $Fe_2O_3$ in an amount up to 5%, the ratio of the mols of FeO, MgO, and CaO to the mols of $Al_2O_3$, $Cr_2O_3$ and $Fe_2O_3$ plus half the mols of $SiO_2$ being at least 4.0.

RALPH JOSEPH MAGRI, JR.

No references cited.